E. N. TRUMP.
APPARATUS FOR UTILIZING THE HEAT OF LIQUIDS.
APPLICATION FILED MAR. 7, 1916.

1,258,165.

Patented Mar. 5, 1918.
2 SHEETS—SHEET 1.

Edward N. Trump, Inventor
By his Attorney
Clarkson A. Collins

E. N. TRUMP.
APPARATUS FOR UTILIZING THE HEAT OF LIQUIDS.
APPLICATION FILED MAR. 7, 1916.

1,258,165.

Patented Mar. 5, 1918.
2 SHEETS—SHEET 2.

Inventor
Edward N. Trump
By his Attorney
Clarkson A. Collins

UNITED STATES PATENT OFFICE.

EDWARD N. TRUMP, OF SYRACUSE, NEW YORK, ASSIGNOR TO THE SOLVAY PROCESS COMPANY, OF SOLVAY, NEW YORK, A CORPORATION OF NEW YORK.

APPARATUS FOR UTILIZING THE HEAT OF LIQUIDS.

1,258,165.   Specification of Letters Patent.   Patented Mar. 5, 1918.

Application filed March 7, 1916. Serial No. 82,630.

*To all whom it may concern:*

Be it known that I, EDWARD N. TRUMP, a citizen of the United States, residing at Syracuse, in the county of Onondaga and State of New York, have invented certain new and useful Improvements in the Apparatus for Utilizing the Heat of Liquids, of which the following is a specification.

As is well known water is, under various conditions in the arts, heated to a relatively high temperature without the direct expenditure of fuel for the purpose of such heating, such as waste water in certain chemical processes and water used for scrubbing hot gases. As a rule these waters carry much sediment causing rapid scaling so that it is difficult to utilize the heat by transfer through surfaces to other liquids. Consequently they are discharged in the hot state into the waste and the acquired heat is lost.

The object of my improvements is to enable the economical utilization of such heat, or heat otherwise acquired, but not sufficient to produce steam at high pressure, for industrial purposes.

My invention is based upon the well-known fact that liquids boil at progressively lower temperatures under progressively lower pressures and I utilize this by subjecting the hot liquid to a series of decreasing pressures and using the vapor given off at the several pressures to perform useful work as by introducing it at successive points into a mixed pressure turbine engine to produce power or by introducing it in corresponding pressures into a multiple effect evaporating apparatus to effect the evaporation of liquids.

Figure 1:
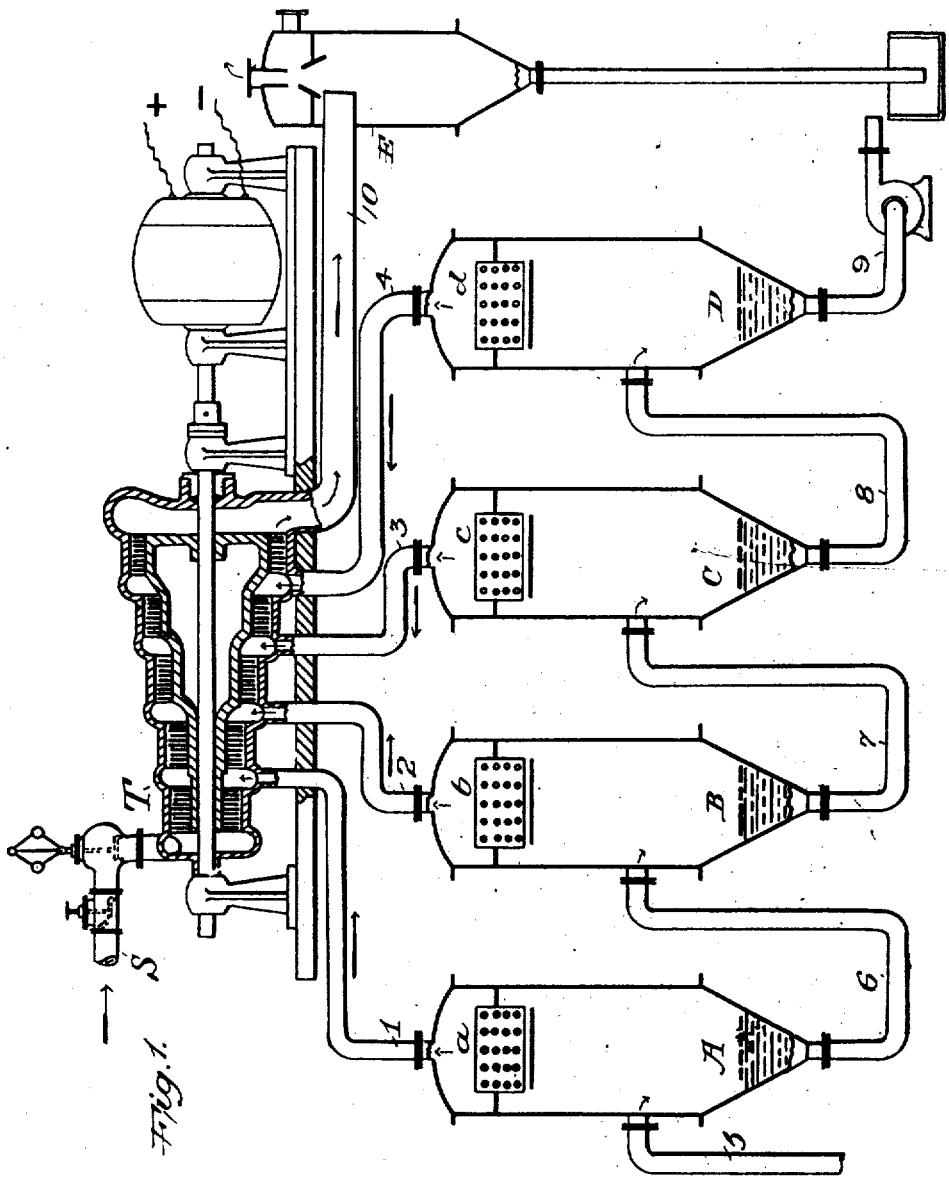
Figure 2:
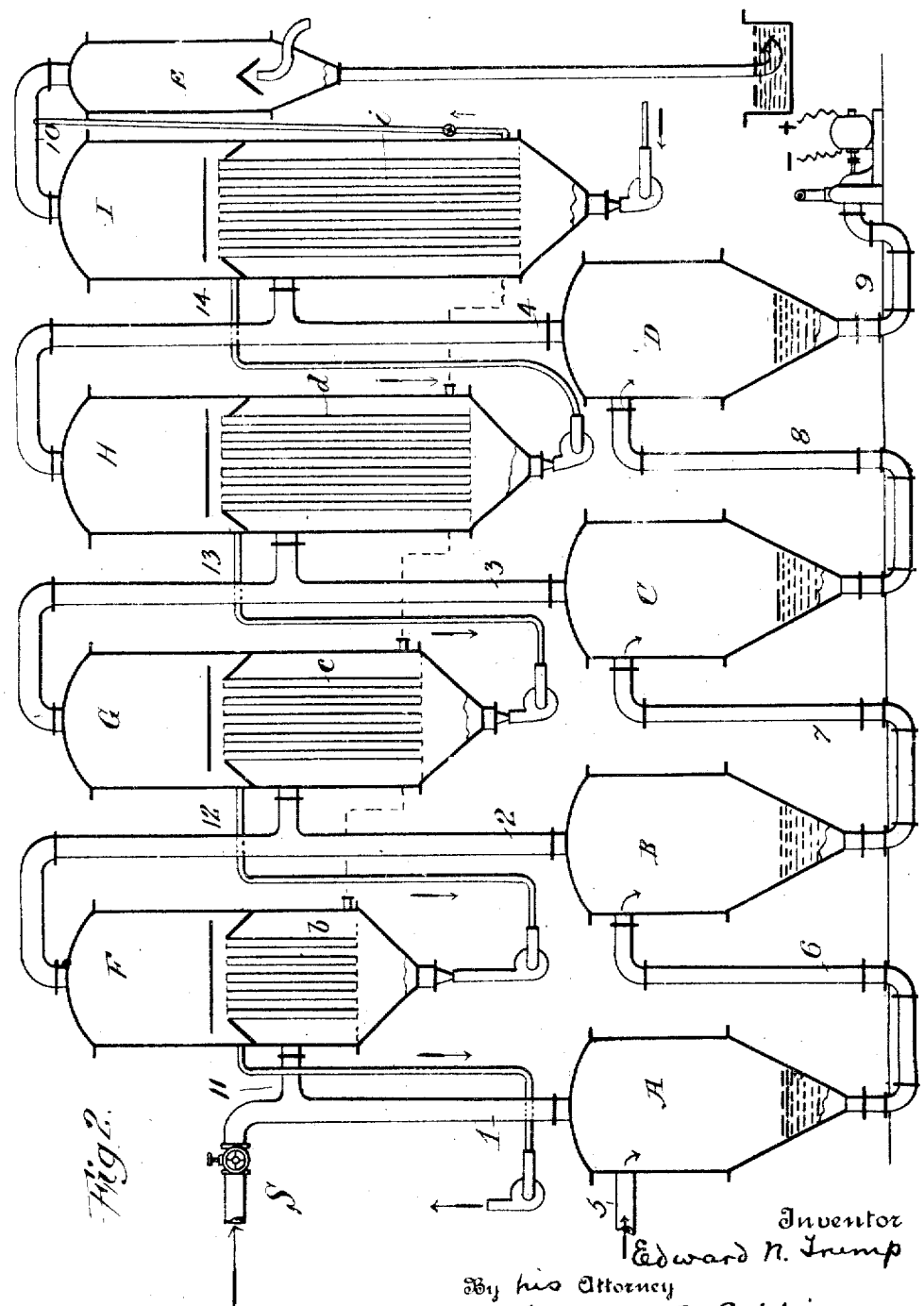

In the accompanying drawings I have illustrated in diagrammatic form means for practising my invention, Figure 1 showing its application to the operation of a turbine engine and Fig. 2 to a multiple effect evaporator, by reference to which the invention will be best understood.

Referring to the drawings, A, B, C, D, indicate a series of steam generating chambers, or separators, which, as shown in Fig. 1, are respectively connected by pipes, 1, 2, 3, 4, with successive ports leading into a mixed pressure turbine, T. If desired each of the separators may be provided with heating coils $a$, $b$, $c$, $d$, whereby the steam generated therein can be dried and its volume expanded.

The hot liquid to be employed is admitted into the first of the series of separators through a pipe, 5, and flows thence successively by pipes, 6, 7, 8, to the separators, B, C, D, being finally drawn off from separator, D, through pipe, 9, by a pump, P.

The exhaust steam from the turbine passes by pipe, 10, to a condenser, E, having a cold water supply. The turbine is supplied with suitable regulating means as a governor with an auxiliary steam supply as indicated at, S.

The shaft of the turbine may have mounted upon it an electric generator, as indicated at, G, or may be otherwise coupled to transmit power.

It will be understood that in operation the pressure in each successive stage of the turbine, approaching the condenser, will be less than in the stage preceding.

Supposing the hot liquid to be admitted to separator, A, at a temperature of 110° C., and to be subjected therein to an absolute pressure of 657 m. m. of mercury, the temperature of the liquid will immediately fall to 96° C., because of the evaporation of vapor. If the liquid is then allowed to pass to separator, B, having an absolute pressure of 384 m. m. of mercury the temperature of the liquid therein will fall to 82° C., with the production of an additional quantity of vapor.

In separator, C, with an absolute pressure of 213 m. m. of mercury, the temperature will fall to 68° C., and in separator, D, with a pressure of 112 m. m. of mercury to 54° C., at which temperature the water will be pumped away.

The quantity of steam, or vapor, produced will approximate 25 kilograms for each cubic meter of the liquid, for each one of the four separators, or a total of 100 kilograms, with a reduction of the temperature of the liquid from 110° C., to 54° C.

The steam thus produced being introduced into the turbine at the points of attachment of the pipes leading from the separators, power will be produced corresponding to the quantity and velocity of the steam from its particular stage through the blades into the condenser.

By introducing the liquid into a series of separators, as above described, the maximum amount of vapor will be produced at pressures corresponding to the temperatures, and a greater amount of power will be obtained by introducing the steam from each separator into the point of corresponding pressure in a turbine, than would be possible by the use of a single separator and single flow turbine.

Substantially the same result may be obtained by attaching the separators to a series of turbines each designed for the pressure of the separator to which it is attached and all passing the steam to the lower pressure in the condenser.

In Fig. 2 of the drawings is shown the application of my invention to the operation of a multiple effect evaporating apparatus. In this case the pipes, 1, 2, 3, 4, leading from the separators A, B, C, D, are respectively connected to the pipes 11, 12, 13, 14, which lead into the steam chambers of the several vacuum pans or effects F, G, H, I, of the evaporating apparatus, and the steam from the corresponding separator is added to that generated by the evaporation of liquid in the preceding effect and passing to that following. The steam generated in the final effect I passes by pipe, 10, to condenser, E; in the usual manner. The heating surfaces in the effects consist of tubes, $f$, $g$, $h$, $i$, which pass through the steam chamber and the tubes are, preferably longer in each effect from, F, to, I, than in the effect preceding so as to provide additional surface to condense the additional steam introduced into each effect.

If desired a supplemental supply of exhaust steam may be introduced into the heating chamber of effect, F, to regulate the pressures or increase the amount of evaporation in accordance with the supply of liquor undergoing treatment. The liquor to be evaporated is preferably fed into the bottom of effect, I, and, climbing the tubes by "grimpage," is carried from effect to effect by the connected pumps, finally passing out of effect F.

The temperature and pressure in each of the separators will be the same as in the preceding effect with the outgoing steam pipe of which it is connected. Under the same conditions the successive temperatures and pressures will be the same as above stated in the case of a turbine engine and the amount of liquid converted into steam in the separators will be the same.

My invention is not limited to the use in the separators of hot waste liquids but I may use hot water from any convenient, economical source, as the water of hot springs, or water heated for the purpose where an economical source of heat or waste heat can be applied.

What I claim as new and desire to secure by Letters Patent is:—

1. In a device for utilizing the heat of liquids the combination of a series of connected liquid containers, means for admitting liquid to and causing it to pass in succession through the containers and for controlling its flow from one container to another, a steam actuated working apparatus comprising a series of chambers, means for maintaining progressively lower steam pressures in said chambers and a pipe connection between each of said liquid containers and one of the chambers of said working apparatus.

2. In a device for utilizing the heat of liquids the combination of a plurality of liquid containers, means for admitting liquid to and causing it to pass in succession through said containers, means for causing the liquid to be discharged into each container at a point above the level of the liquid therein, a steam actuated working apparatus comprising a series of chambers, means for maintaining progressively lower steam pressures in said chambers and a pipe connection between each of said liquid containers and one of the chambers of said working apparatus.

3. In a device for utilizing the heat of liquids the combination of a plurality of liquid containers, means for admitting liquid to and causing it to pass in succession through said containers, a liquid seal interposed between each two of the containers, means for subjecting the liquid in said containers to progressively lesser pressures, a working apparatus comprising a series of chambers and a pipe connection between each of said liquid containers and one of the chambers of the working apparatus.

In testimony whereof, I have hereunto subscribed my name, this 24th day of February A. D., 1916.

EDWARD N. TRUMP.